July 7, 1970 R. C. A. CHARMASSON 3,518,875
OSMOMETER
Filed Feb. 26, 1968
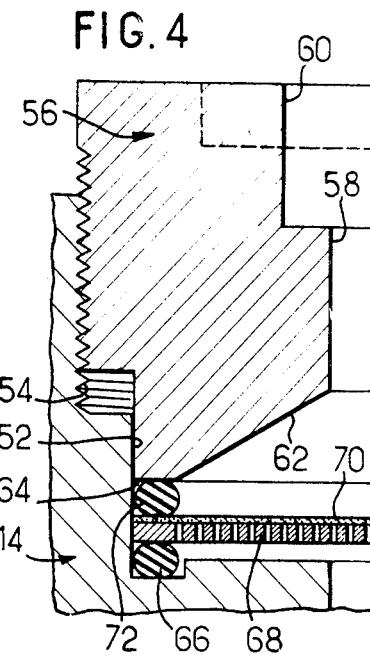
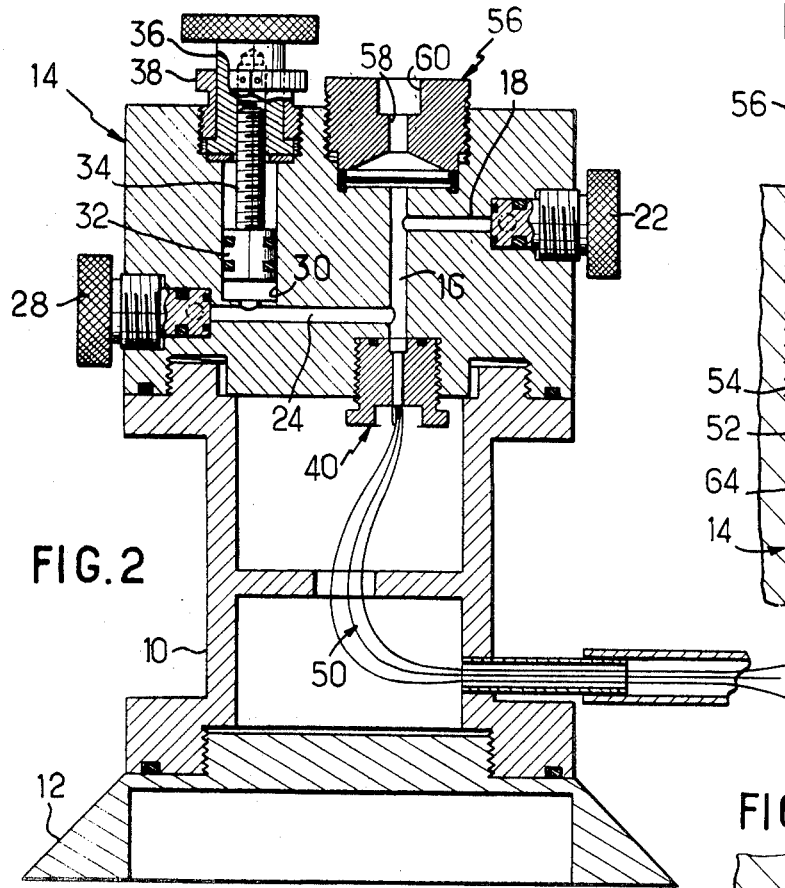
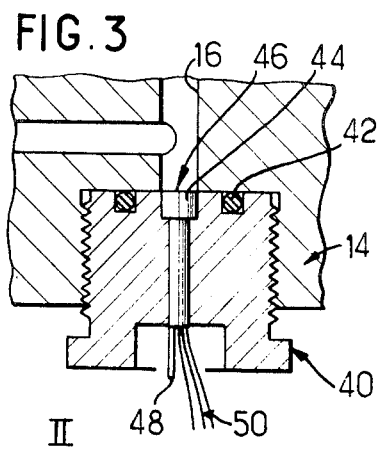
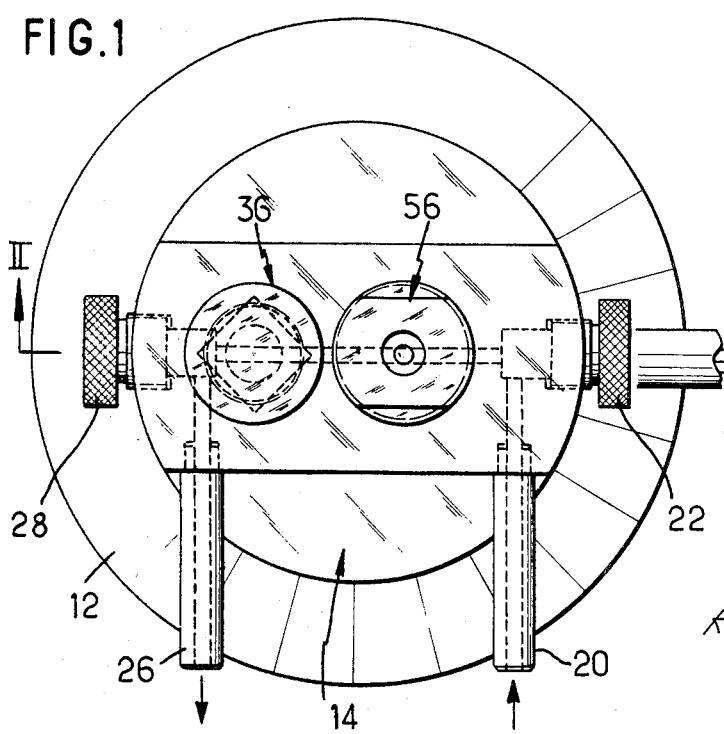
INVENTOR
RENE CASIMIR AUGUSTE
    CHARMASSON
BY Young + Thompson
    ATTYS.

United States Patent Office 3,518,875
Patented July 7, 1970

3,518,875
OSMOMETER
René Casimir Auguste Charmasson, Marseille, France
(92 Impasse Raynaud, Rue Carreterie, 84 Avignon, France)
Filed Feb. 26, 1968, Ser. No. 708,177
Int. Cl. G01n 13/04
U.S. Cl. 73—64.3
2 Claims

ABSTRACT OF THE DISCLOSURE

In an osmometer comprising, on each side of a semipermeable diaphragm, an open chamber and a closed, so called measurement chamber with a pressure detector in its confining wall, a constant-volume measurement chamber is obtained by applying the semipermeable diaphragm against a rigid supporting grid. The confining wall of said chamber has a movable portion and an adjustment member permits the position of this movable portion to be modified.

BACKGROUND OF THE INVENTION

The measurement of the osmotic pressure of solutions is an important source of information, especially in macromolecular chemistry and in biology.

In the first osmometers employed, the pressure resulting from the osmotic flow, that is to say from the passage of the solvent through a semipermeable diaphragm, from a compartment filled with solvent to a second compartment filled with solution, was measured by taking the difference in levels between two capillary tubes. These first instruments were not practical and were difficult to use, in particular because the equilibrium of the pressures required a considerable time to obtain. This equilibrium time was especially bound-up with the necessity of giving the semipermeable diaphragm a sufficiently fine porosity to prevent the molecules of solution from being carried by diffusion through the said diaphragm.

A first improvement consisted of proceeding by compression or decompression of one of the compartments until the osmotic flow through the semipermeable diaphragm was stopped, that is to say until an osmotic equilibrium was obtained. This resulted in a considerable gain, but it remained difficult to produce an osmotic equilibrium in a precise and sufficiently rapid manner.

A further important improvement was described in the U.S. Pat. No. 3,187,562, issued to Rolfson on June 8, 1965. Instead of using a liquid level as a reference, Rolfson utilizes for the solution compartment a closed chamber comprising a flexible metal diaphragm incorporated in a capacitive detector, the amplified signals of which control a servo-motor acting on the pressure applied to the solvent.

Under the effect of osmosis, the pressure tends to increase in the solution compartment and tends to deform the diaphragm; the collected and amplified signal causes a decompression of the solvent compartment until the said diaphragm returns to its initial position. The Rolfson apparatus is therefore an automatic osmometer which makes it possible to obtain a rapid osmotic equilibrium corresponding to zero flow of solvent through the semipermeable diaphragm separating the solution compartment from the solvent compartment.

The Rolfson apparatus is however relatively complicated and expensive. It is difficult to mount it inside a thermostat so as to ensure a uniform temperature. Furthermore, it has the disadvantage that it does not take account of the displacement of the semipermeable diaphragm, which is always much more flexible and deformable than the metal diaphragm which controls the servo-mechanism. For this reason, the Rolfson apparatus cannot be considered as a constant-volume osmometer.

SUMMARY OF THE INVENTION

The present invention has for its object the production of a rapid osmometer of simple construction which does not necessitate the use of any complex servo-mechanism. The invention essentially tends to achieve this result by virtue of the use of a constant-volume measuring chamber, that is to say, a chamber in which all the confining walls, including the semipermeable walls, will be rigidly supported. A measurement chamber thus constituted, which may contain, depending on the case, either the solution or the pure solvent, presents the great advantage of permitting a practically instantaneous balancing of the pressures. This result is bound-up with the fact that in a constant-volume compartment filled with liquid, the pressure varies very rapidly as soon as an extremely small number of molecules of liquid have diffused by osmosis through the semipermeable wall. It is this rapidity of variation of pressure which renders superfluous any balancing servo-mechanism.

The invention furthermore provides a simple means of obtaining practically perfect fluid-tightness at the level of fixation of the semipermeable diaphragm. This fluid-tightness is of fundamental importance, since any imperfection of sealing of the fixing means results in a deficiency error in measurement, rendering the balancing pressure measured less than the true osmotic pressure.

The invention has also for its object a self-contained and compact osmometer which can readily be placed in a thermostat, thereby ensuring perfect uniformity of temperature during the course of measurement.

BRIEF DESCRIPTION OF THE DRAWINGS

FIG. 1 is a plan view of an apparatus in accordance with the invention;

FIG. 2 is an elevation in cross-section, taken along the plane II—II of FIG. 1;

FIGS. 3 and 4 are enlarged partial views of FIG. 2, showing respectively the mounting of the pressure detector and the fixing of the semipermeable diaphragm.

DESCRIPTION OF THE PREFERRED EMBODIMENT

According to the chosen form of embodiment shown in the drawings, the apparatus comprises a supporting foot 10 of generally cylindrical hollow shape, screwed on a base 12 and having a body 14 fixed to its upper portion, also by screwing. This body, which is a solid piece of metal, comprises a vertical bore 16 forming a measurement chamber in communication by a branch conduit 18 with a filling pipe 20 controlled by a fluid-tight closure cock 22. The bore 16 is also in communication by a branch conduit 24 with a drainage pipe 26 controlled by a fluid-tight stop-cock 28. The branch conduit 24 is also in communication with a cylindrical bore 30 in which is arranged to slide a piston 32 fixed to a threaded rod 34 cooperating with an adjustment nut 36 which is free for rotation but fixed in the axial direction by means of a guiding member 38, made in two parts and screwed into the widened and threaded upper part of the bore 30.

As is more clearly shown in FIG. 3, the bore 16 is limited at its lower extremity by a plug 40 screwed into a threaded counterbore formed for that purpose in the lower face of the body 14, and forming a fluid-tight closure by means of a toric joint 42 round the outlet of the bore 16. In a counterbored hole drilled for that purpose on the axis of the plug 40, a subminiature pressure transducer or detector 44 is housed and fixed by sticking, this transducer being for example of the type sold under the reference Model HFD by the Schavitz Bytrex Co. Inc. The pressure-sensitive surface 46 of this transducer constitutes the bottom end of the bore 16. At the opposite extremity of the transducer is provided a reference-pressure tube 48 which is open to the atmosphere, together with the outgoing wires 50 which are intended to connect the transducer to an electrical measurement circuit (not shown).

As is more clearly shown in FIG. 4, the bore 16 opens at its upper portion into the centre of the bottom of a cylindrical cavity 52 pierced in the upper face of the body 14, with a widened and threaded entrance portion 54. Into this threaded portion 54 is screwed a member 56, the lower part of which is adapted too engage with light friction in the interior of the cylindrical bore 52. This member comprises a cylindrical bore 58 having an upper portion 60 of larger diameter and a lower portion 62 of frusto-conical flared form so as to terminate at a flattened end portion 64.

In a peripheral groove formed for this purpose in the periphery of the bottom of the bore 52 is placed a toric joint 66, on which is placed a rigid grid or plate 68 of stainless steel pierced with a large number of perforations over its whole surface with the exception of a peripheral zone located facing the joint 66. It is on this perforated plate that the semipermeable diaphragm 70 is placed, and above this diaphragm is mounted finally a further toric joint 72. The normally projecting upper portion of the part 56 comprises two diametrically opposite flats permitting the screwing and unscrewing of the part 56 by means of the usual kind of spanner.

Apart from the diaphragm 70 and the various joints, which may advantageously be made of polytetrafluoroethylene, all the parts are preferably made of stainless steel which especially makes it possible to study solvents which are of a particularly corrosive nature.

The supporting foot 10 and also the body 14 can be directly mounted inside a thermostat, which makes possible a rapid and convenient balancing of the temperatures.

With the position as described of the semipermeable diaphragm 70 above the perforated supporting plate 68, the measurement chamber will form the solvent compartment, while the open chamber 58 formed by the part 66 above the diaphragm 70 will constitute the solution compartment.

The utilization of the apparatus is effected as follows: the supply pipe 20 being coupled to a tank of pure solvent (not shown), the cock 22 is first opened until all the cavities of the body 14 are filled with the pure solvent. The part 56 being removed, there are successively placed over the joint 66, the supporting grid 68, the semipermeable diaphragm 70 and the toric joint 72, after which the part 66 is again screwed in until the elements 68 and 70 are gripped between the joints 66 and 72. After this assembly, during which no over-pressure can be produced in the apparatus, the inlet cock 22 is closed. The pressure transducer 44 is influenced by the hydrostatic pressure of the liquid above it, taking account of the presence of the semipermeable diaphragm which, due to its tension and to an effect of asymmetry, can give rise to a pressure difference which is not negligible.

The solvent is then emptied from the upper chamber 58, by means of a pipette for example, and is filled with an equal volume of solution. This introduction of the solution is immediate and particularly convenient, due to the absence of capillary tubes. By acting on the adjustment nut 36, a slight upward movement of the piston is produced; due to the suction thus produced on the solvent, the semipermeable diaphragm 70 becomes applied against its support 68, thus forming a rigid semipermeable wall. The solution being contained in the upper chamber 58, the osmotic flow will continue to hold the diaphragm applied against the supporting grid. It will also be noted that this particularly easy method of procedure avoids any risk of partial drying of the upper face of the semipermeable diaphragm.

The osmotic flow which is established by diffusion of the solvent through the diaphragm 70 maintains a depression in the measurement chamber and the pressure transducer indicates a value less than the hydrostatic pressure of the liquids which are above it. This fall in pressure registered by the transducer and corrected when necessary by the difference in density between the solution and the solvent, is a measure of the osmotic pressure of the solution.

Experience has shown that the osmotic equilibrium is reached rapidly, which is explained by the fact that the measurement chamber 16 is at practically constant volume, by virtue on the one hand of the fact that the miniature transducer 44 only introduces entirely negligible variations of volume during the course of measurement, and on the other hand, due to the fact that the diaphragm 70 is held against its perforated support 68 so as to form a rigid semipermeable wall.

It would also be possible to cause the constant-volume chamber 16 to function as the solution compartment. To this end, it is only necessary to reverse the relative positions of the semipermeable diaphragm and the perforated supporting plate. In other words, it is essential that the semipermeable diaphragm should be located on the solution compartment side with respect to its supporting grid.

A further possible alternative arrangement consists of mounting the diaphragm between two supporting grids.

The main advantages of the osmometer described above may be recapitulated as follows:

Rapidity of measurement, rendering superfluous the use of a servo-control system;

Elimination of all lateral leakages at the level of the semipermeable diaphragm;

Great accuracy due to the elimination of all mechanical coupling with the part of the wall which serves in measuring the pressure;

Great convenience of use;

Possibility of operation at high pressure and at high temperature.

It will of course be understood that the present invention is not restricted to the forms of construction described and shown, but includes all its alternative forms. For example, the invention may utilize pressure transducers of types other than those described, in particular transducers of the type utilizing gauges with diffused elements, of the Kulite type for example.

What I claim is:

1. An osmometer comprising a rigid body containing a chamber open to the atmosphere and having a bottom wall, a plurality of confinement walls defining within said body a closed measurement chamber comprising a bore extending from an opening in said bottom wall, one of said confinement walls comprising a rigid supporting grid and semipermeable diaphragm assembly substantially coextensive with said bottom wall in combination with at least one toric joint and means for pressing said assembly against said bottom wall along said joint, a pressure transducer incorporated into another of said confinement walls, said confinement walls further comprising a movable portion and an adjustment member adapted to permit the position of said movable portion to be modified.

2. An osmometer as claimed in claim 1, comprising a solid body on a hollow foot, a first bore pierced in said body, said first bore having two end portions of larger diameter and at least partly threaded, a first radial conduit starting from said first bore, a liquid inlet pipe provided with a stop-cock put into communication with said first radial conduit, a second radial conduit starting from said first bore, a liquid outlet pipe put into communication with said second conduit and equipped with a second stop-cock, a second bore also put into communication with said second conduit, a piston in said second bore and means for displacing said piston, a plug screwed into one end portion of said first bore, a pressure transducer fixed in said plug, the pressure-sensitive surface of said transducer closing the adjacent extremity of said first bore, a first toric joint arranged at the bottom of the other end portion of said first bore, a rigid supporting grid and semi-permeable diaphragm assembly placed on said first joint, a second toric joint placed on said assembly, a part adapted to be screwed into said other end portion and to compress said two joints, said open chamber being constituted by a recess formed in said part.

References Cited

UNITED STATES PATENTS

| 2,716,886 | 9/1965 | Rowe | 73—64.3 |
| 3,187,562 | 6/1965 | Rolfson | 73—64.3 |
| 3,248,932 | 5/1966 | Bohrer | 73—64.3 |

S. CLEMENT SWISHER, Primary Examiner

J. W. ROSKOS, Assistant Examiner